US012679219B2

(12) United States Patent
Liao

(10) Patent No.: US 12,679,219 B2
(45) Date of Patent: **\*Jul. 14, 2026**

(54) ELECTRIC BALANCE BIKE

(71) Applicant: HL CORP (SHENZHEN), Shenzhen (CN)

(72) Inventor: Xuesen Liao, Shenzhen (CN)

(73) Assignee: HL CORP (SHENZHEN), Shenzhen (CN)

( * ) Notice: Subject to any disclaimer, the term of this patent is extended or adjusted under 35 U.S.C. 154(b) by 114 days.

This patent is subject to a terminal disclaimer.

(21) Appl. No.: 18/633,528

(22) Filed: Apr. 12, 2024

(65) Prior Publication Data

US 2024/0253473 A1 Aug. 1, 2024

Related U.S. Application Data

(63) Continuation-in-part of application No. 17/745,905, filed on May 17, 2022, now abandoned, which is a continuation of application No. PCT/CN2020/000287, filed on Nov. 23, 2020.

(51) Int. Cl.
| | |
|---|---|
| *B60L 15/20* | (2006.01) |
| *B60L 58/10* | (2019.01) |
| *B62J 43/16* | (2020.01) |
| *B62J 50/22* | (2020.01) |
| *B62K 23/02* | (2006.01) |
| *B62M 7/04* | (2006.01) |
| *B62M 9/00* | (2006.01) |

(52) U.S. Cl.
CPC ............... *B60L 15/20* (2013.01); *B60L 58/10* (2019.02); *B62J 43/16* (2020.02); *B62J 50/22* (2020.02); *B62K 23/02* (2013.01); *B62M 7/04* (2013.01); *B62M 9/00* (2013.01)

(58) Field of Classification Search
CPC ... B62M 6/40; B62M 6/45; B62M 6/50; B62J 3/10; B62J 3/12; B62J 3/14
See application file for complete search history.

(56) References Cited

U.S. PATENT DOCUMENTS

| | | | | |
|---|---|---|---|---|
| 2017/0259879 A1* | 9/2017 | Southey | ................... | B62J 43/20 |
| 2018/0222549 A1* | 8/2018 | Ragland | ................ | B62K 11/14 |
| 2019/0263468 A1* | 8/2019 | Huang | ................... | B62K 15/00 |
| 2021/0061409 A1* | 3/2021 | Ricco | ...................... | B62L 1/005 |

* cited by examiner

*Primary Examiner* — Christopher B Wehrly
(74) *Attorney, Agent, or Firm* — Hemisphere Law, PLLC

(57) ABSTRACT

An electric balance bike includes an actuating assembly, a battery, and a controller. The actuating assembly includes an actuator located below an intermediate section of a bike frame, a driving member located at an axle of a rear wheel, and a driving belt that is wrapped around the actuator and the driving member. The battery is detachably connected to the actuating assembly. The power abnormality response system is arranged in the controller, and the power abnormality response system includes a determination component, detection components, and a warning component, the determination component is respectively connected to the detection components and the warning component, the detection components respectively detect running statuses of the actuator and the battery and output detection values, the determination component receives the detection values and determines whether the detection values are abnormal or not to output different control signals.

10 Claims, 6 Drawing Sheets

ELECTRIC BALANCE BIKE

CROSS REFERENCE TO RELATED APPLICATIONS

The present application is a continuation-in-part application of International Application PCT/CN2020/000287, with an international filing date of Nov. 23, 2020, which claims foreign priority of Chinese patent application Ser. No. 201922167656.3, filed on Nov. 25, 2019 in the China National Intellectual Property Administration of China, the contents of all of which are hereby incorporated by reference.

BACKGROUND

1. Technical Field

The present disclosure generally relates to electric bikes, and particularly to an electric balance bike having a power abnormality response system applied to an actuating assembly for responding different warnings corresponding to various abnormal conditions, which accelerates determination and elimination of fault factors, thereby improving riding safety.

2. Description of Related Art

Electric bicycles are a very common means of transportation. They not only allow people to travel conveniently, but also do not produce any waste gas such as carbon dioxide when moving, which has the effect of energy saving and environmental protection. Therefore, electric bicycles have gradually become the first choice for many people as a means of transportation.

As a vehicle with battery cells as power source, electric bicycles have roughly the same structure as ordinary bicycles. The only difference is that an electric bicycle has a battery unit and a motor electrically connected to the battery unit as driving power. The motor uses the power of the battery unit as a power source, and drives the wheels of the electric bicycle to rotate, thereby driving the electric bicycle to move.

Currently, vehicles for children, such as electric bikes and electric scooters, generally include driving devices and electric control devices, such as batteries and motors; the electric bikes and the electric scooters are generally provided with power warning devices for displaying corresponding battery power, if the corresponding batter power is insufficient, a warning is sent out for reminding users; however, the driving devices and the electric control devices may also having abnormal conditions when in use, for example, the motors are over current and abnormally works, temperatures of the driving devices and the electric control devices are abnormal, or the driving devices and the electric control devices are damaged, therefore, only a single warning device is insufficient to provide security guarantee for the users. And therefore, providing more abnormality response technologies is an important topic for those who skilled in the art.

SUMMARY

Based on above, the present disclosure aims to provide an electric balance bike having a power abnormality response system applied to an actuating assembly for responding different warnings corresponding to various abnormal conditions, which accelerates determination and elimination of fault factors, thereby improving riding safety.

The present disclosure provides the electric balance bike, including a bike frame, a front fork, a handlebar, a front wheel, a rear wheel, the actuating assembly, a battery, and a controller. The bike frame includes a seat at an intermediate position thereof, a head tube at a front end thereof, and a rear fork at a rear end thereof. The front fork is connected to a lower end of the head tube. The handlebar is connected to the head tube, and is configured to control rotation of the front fork. The front wheel is connected to the front fork. The rear wheel is connected to the rear fork. The actuating assembly is arranged between the bike frame and the rear wheel, the actuating assembly includes an actuator located below an intermediate section of the bike frame, a driving member located at an axle of the rear wheel, and a driving belt that is wrapped around the actuator and the driving member. The battery is detachably connected to the actuating assembly. The power abnormality response system is arranged in the controller, and the power abnormality response system includes a determination component, detection components, and a warning component, the determination component is respectively connected to the detection components and the warning component, the detection components respectively detect running statuses of the actuator and the battery and output detection values, the determination component receives the detection values and determines whether the detection values are abnormal or not to output different control signals to drive the warning component to respectively send out different warning signals.

When the actuator is driven by electric power for actuation, the driving belt drives the electric balance bike to move, and the power abnormality response system detects the running statuses of the actuator of the actuating assembly and the battery to determine whether the actuator and the battery are abnormal or not, if the actuator and the battery are abnormal, a warning may be sent out, thereby improving the riding safety.

Furthermore, the actuating assembly further includes a power-on speed regulation control member and a power-off brake control member, the power-on speed regulation control member and the power-off brake control member are located at the handlebar and are respectively connected to the controller to control the battery to supply power or not and set power outputting statuses of the actuator according to changes of an operation program of the controller, so that a highest running speed of the electric balance bike is controlled.

Furthermore, the power-on speed regulation control member and the power-off brake control member are respectively arranged at a left side and a right side of the handlebar, and the power-on speed regulation control member includes a reset button and a speed regulator.

Furthermore, the detection components are connected to the power-on speed regulation control member and the power-off brake control member.

Furthermore, the detection components include voltage feedback circuits, the battery is connected to the voltage feedback circuits, so that a voltage of the battery is detected to confirm an electric quantity of the battery.

Furthermore, the detection components include current feedback circuits, the actuator is connected to the current feedback circuits, so that a current of the actuator is detected.

Furthermore, the detection components include heat sensing members, the heat sensing members are respectively connected to the battery, the actuator, the power-on speed regulation control member, and the power-off brake control member for detecting running temperatures.

Furthermore, the detection components include timing members, the timing members are connected to the actuator, the battery, the power-on speed regulation control member, and the power-off brake control member for detecting running times.

Furthermore, the warning component sends out a sound warning signal or an image warning signal.

Furthermore, the warning component is a buzzer and/or a meter.

Furthermore, the determination component includes a program and an instruction for receiving detection values output by the detection components and determining that whether the detection values are abnormal or not, and the warning component is driven to respectively send out at least one warning signal.

Figure 1:
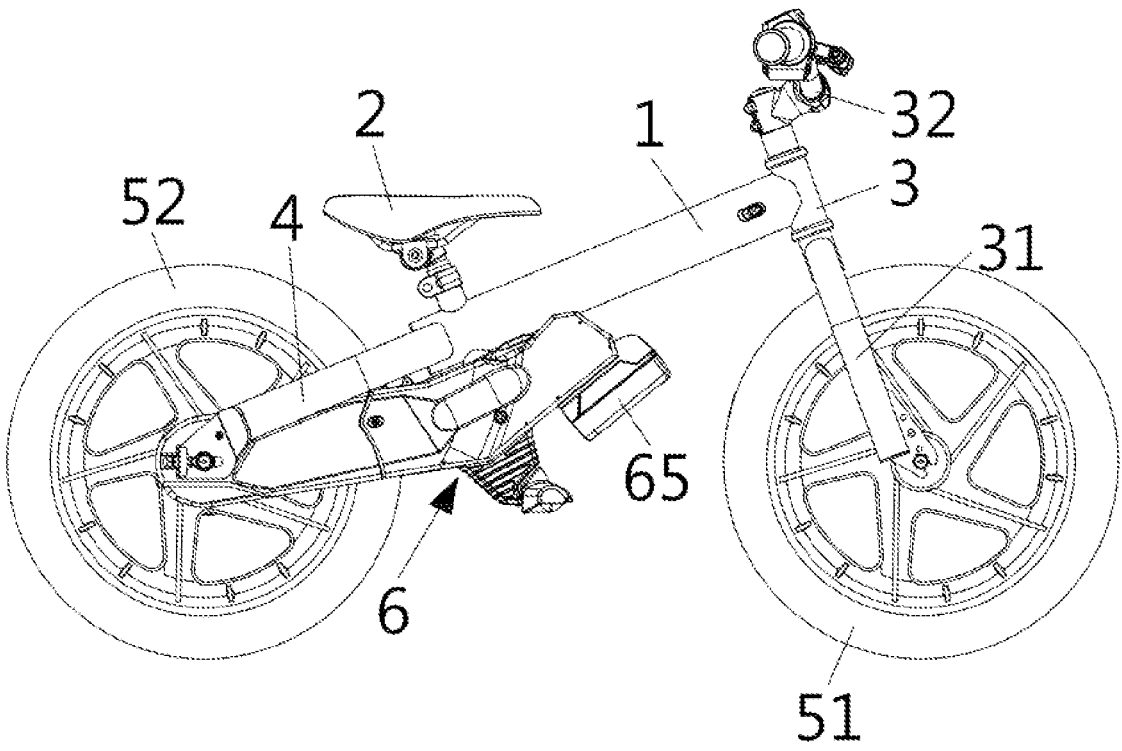
FIG. 1 is a structural schematic diagram of an electric balance bike according to one embodiment of the present disclosure.

Reference numerals in the drawings: 1. bike frame; 2. seat; 3. head tube; 31. front fork; 32. handlebar; 4. rear fork; 51. front wheel; 52. rear wheel; 6. actuating assembly; 61. actuator; 62. driving member; 63. driving belt; 64. toothed disc; 65 battery; 66. power-on speed regulation control member; 661. reset button; 662. speed regulator; 67. power-off brake control member; 7. controller; 70. power abnormality response system 70; 71. determination component; 72. detection component; 721. heat sensing member; 722. timing member; 73. warning member.

DETAILED DESCRIPTION

In order to facilitate the examiner to understand technical features, content, and advantages of the present disclosure and effects achieved thereby, the present disclosure is described in detail with reference to accompanying drawings and is described in detail in a form of an embodiment, and is not necessarily a true scale and an accurate configuration after implementation of the present disclosure, so it should be understood that ratios and configuration relationships of the accompanying drawings should not be construed as limiting a scope of the present disclosure in practice.

Figure 2:
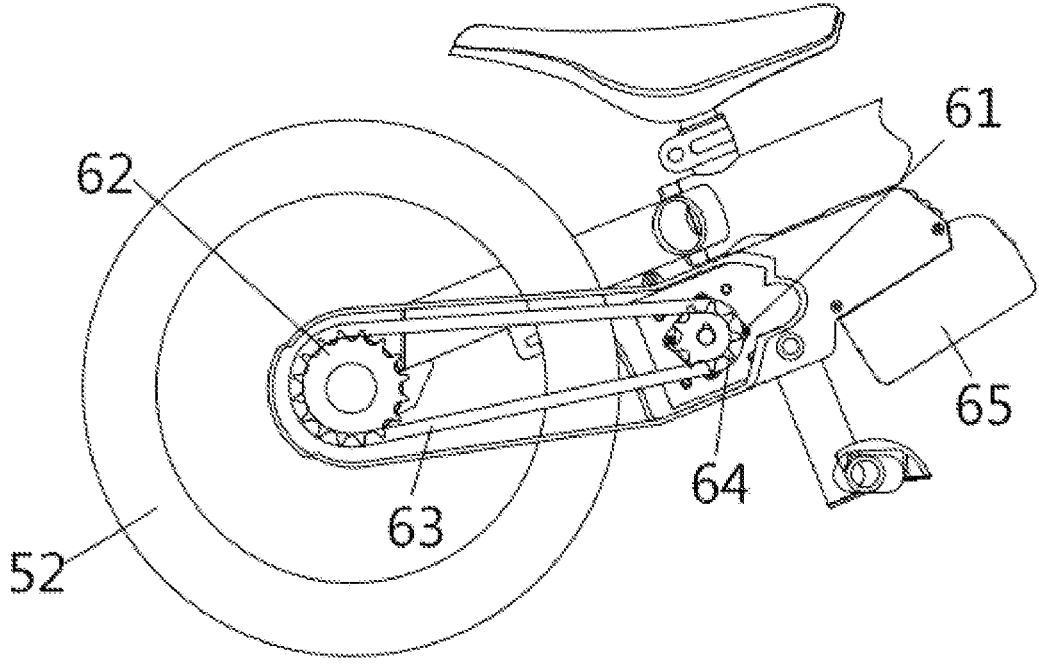
FIG. 2 is a structural schematic diagram of an actuating assembly of the electric balance bike according to one embodiment of the present disclosure.

Please refer to FIGS. 1, FIG. 1 is a structural schematic diagram of an electric balance bike according to one embodiment of the present disclosure, the electric balance bike includes a bike frame 1, a front fork 31, a handlebar 32, a front wheel 51, a rear wheel 52, an actuating assembly 6, a battery 65, and a controller 7. The bike frame 1 includes a seat 2 at an intermediate position thereof, a head tube 3 at a front end thereof, and a rear fork 4 at a rear end thereof. The front fork 31 is connected to a lower end of the head tube 3. The handlebar 32 is connected to the head tube 3, and is configured to control rotation of the front fork 31. The front wheel 51 is connected to the front fork 31. The rear wheel 52 is connected to the rear fork 4. The actuating assembly 6 is arranged between the bike frame 1 and the rear wheel 52, the actuating assembly 6 includes an actuator 61 located below an intermediate section of the bike frame 1, a driving member 62 located at an axle of the rear wheel 52, and a driving belt 63 that is wrapped around the actuator 61 and the driving member 62. Please further refer to FIG. 2, a toothed disc 64 is connected to a shaft of the actuator 61. The actuator 61 is laterally arranged below the intermediate section of the bike frame 1, and the driving belt 63 is wrapped around the driving member 62 and the toothed disc 64. In one embodiment, the driving member 62 may be in the form of a toothed disc. The battery 65 is detachably connected to the actuating assembly 6. The controller 7 is respectively connected to the actuator 7 and the battery 65.

Figure 3:
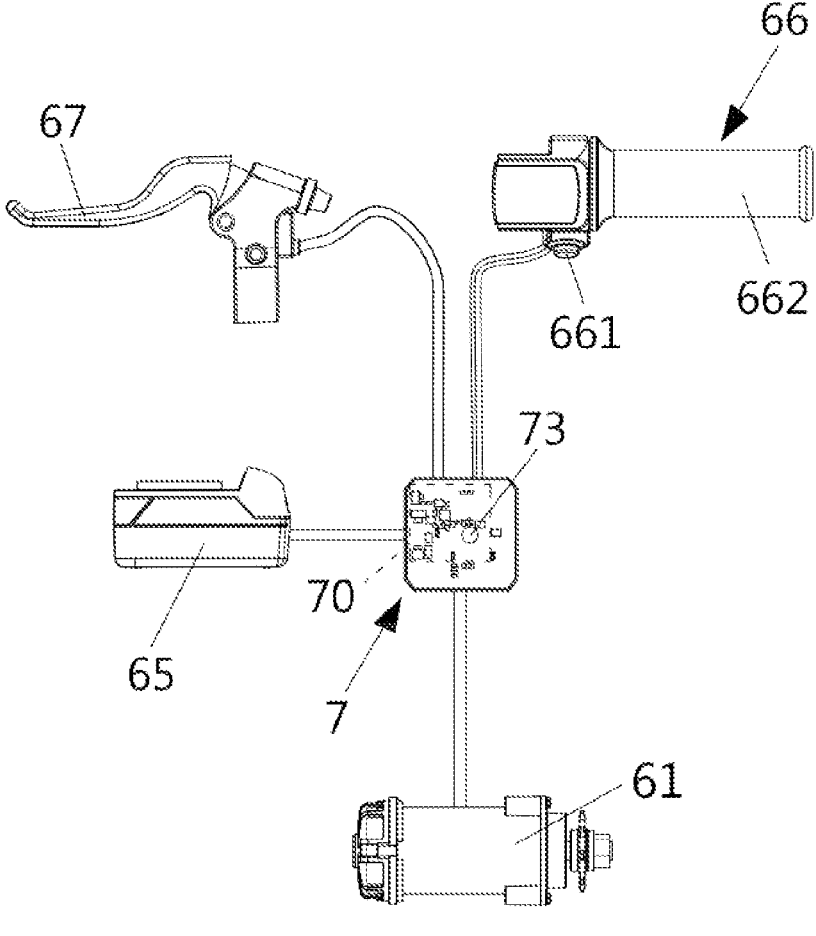
FIG. 3 is a structural schematic diagram of a power abnormality response system and the actuating assembly according to one embodiment of the present disclosure.
Figure 4:
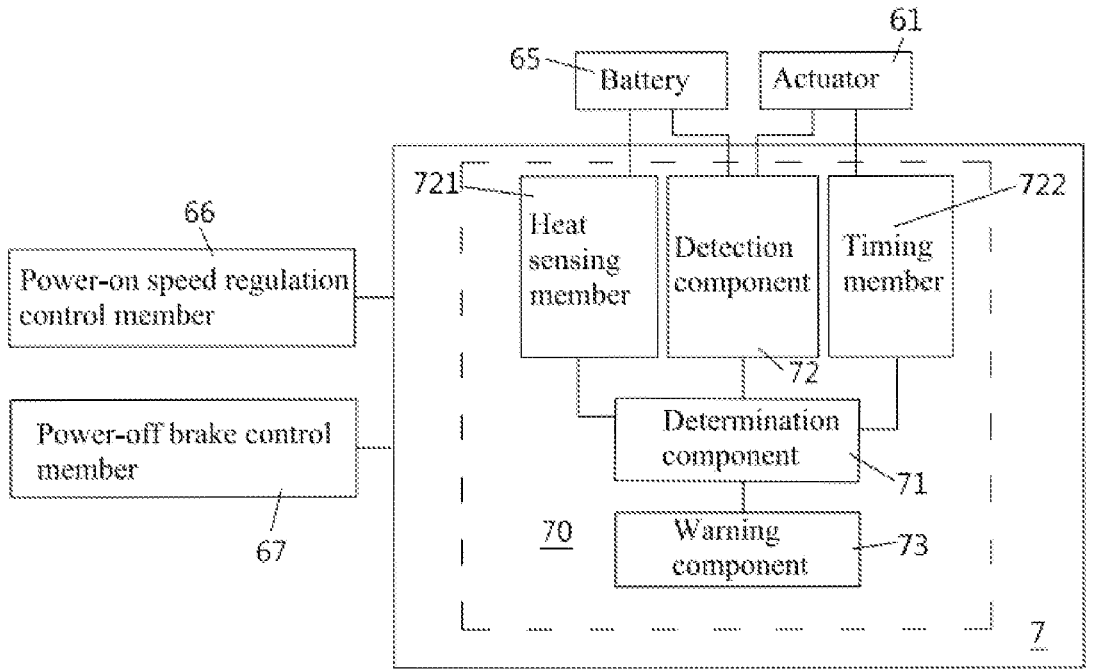
FIG. 4 is a structural schematic diagram of the power abnormality response system according to one embodiment of the present disclosure.

The power abnormality response system 70 is arranged in the controller 7, as shown in FIGS. 3-4, the power abnormality response system 70 includes a determination component 71, detection components 72, and a warning component 73, the determination component 71 is respectively connected to the detection components 72 and the warning component 73, the detection components 72 are connected to the actuator 61 and the battery 65, the detection components 72 respectively detect running statuses of the actuator 61 and the battery 65 and output detection values, the determination component 71 receives the detection values and determines whether the detection values are abnormal or not to output different control signals to drive the warning component 73 to respectively send out different warning signals.

Figure 5:
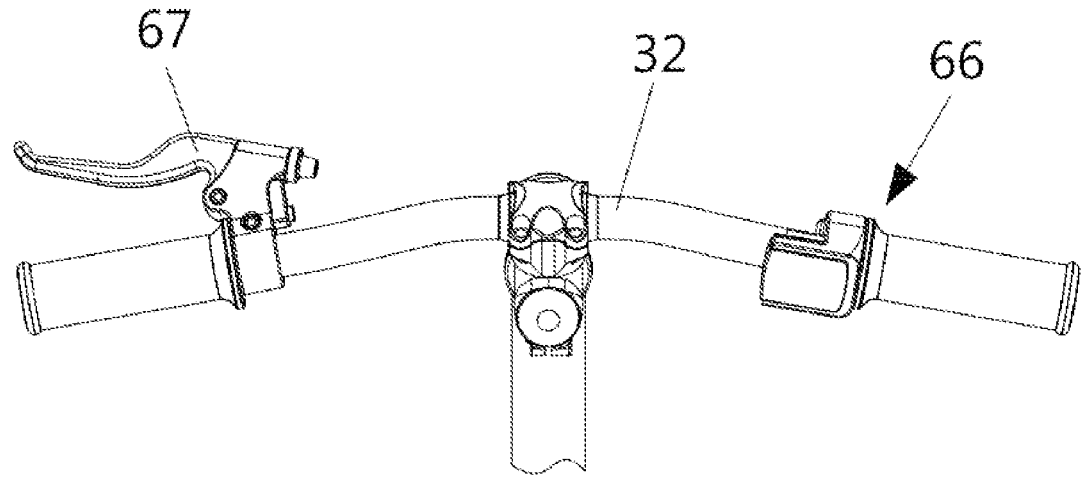
FIG. 5 is a structural schematic diagram of a handlebar of the electric balance bike according to one embodiment of the present disclosure.

Furthermore, the actuating assembly 6 further includes a power-on speed regulation control member 66 and a power-off brake control member 67, please further refer to FIGS. 3-5, the power-on speed regulation control member 66 and the power-off brake control member 67 are located at the handlebar 32 and are respectively connected to the controller 7 to control the battery 65 to supply power or not and set power outputting statuses of the actuator 61 according to changes of an operation program of the controller 7, so that a highest running speed of the electric balance bike is controlled. In one embodiment, the power-on speed regulation control member 66 and the power-off brake control member 67 are respectively arranged at a left side and a right side of the handlebar 32, and the power-on speed regulation control member 66 includes a reset button 661 and a speed regulator 662. As shown in the drawings, the reset button 661 is a button, the speed regulator 662 is a handlebar structure arranged on the left side of the handlebar 32, the power-off brake control member 67 is a pulling rod arranged on the right side of the handlebar 32, and the controller 7 and the power abnormality response system 70 are also capable of being integrated into a circuit board. The actuating assembly 6 further includes a display, or, the reset button 661, the speed regulator 662, and the display are integrated into the power-on speed regulation control member 66 to be a modular structure; in one embodiment, the speed regulator 662 is a deflector rod structure, and the display is capable of being structured in different forms; or, the controller 7 is directly connected to a meter, the meter replaces the display, and the reset button 661 is capable of being integrated on the meter.

In one embodiment, the detection components 72 are connected to the actuator 61, the battery 65, the power-on speed regulation control member 66, and the power-off brake control member 67. The detection components 72 respectively detect the running statuses of members, such as the actuator 61, the battery 65, the power-on speed regulation control member 66, and the power-off brake control member 67, and output corresponding detection values, the determination component 71 receives the corresponding detection values and determines whether the corresponding detection values are abnormal or not to output different control signals to drive the warning component 73 to respectively send out different warning signals.

In one embodiment, the detection components 72 include voltage feedback circuits, the battery 65 is connected to the voltage feedback circuits, so that a voltage of the battery 65 is detected to confirm an electric quantity of the battery 65. The detection components 72 include current feedback circuits, the actuator 61 is connected to the current feedback circuits, so that a current of the actuator 61 is detected. The detection components 72 include heat sensing members 721, the heat sensing members 721 are respectively connected to the members, such as the actuator 61, the battery 65, the power-on speed regulation control member 66, and the power-off brake control member 67, for detecting running temperatures. The detection components 72 include timing members 722, the timing members 722 are connected to the members, such as the actuator 61, the battery 65, the power-on speed regulation control member 66, and the power-off brake control member 67, for detecting running times. The warning component 73 is a buzzer and is capable of sending out a sound warning signal; or, the warning component 73 is a display or a meter and is capable of sending out an image warning signal.

When using the electric balance bike, the battery 65 is assembled on the bike frame 1, users may set the power outputting statuses of the actuator 61 according to the changes of the operation program of the controller 7, so that the actuator 61 has at least two different rotating speed statuses and the actuator 61 provides corresponding speed limitations on the electric balance bike under different power outputting statuses, therefore, a highest running speed of the electric balance bike is controlled, so as to ensure safety of users with different riding capabilities.

In a riding process, the detection components 72 perform detection at the same time and transmit the detection values to the determination component 71, and the determination component 71 determines whether the detection values are abnormal or not, and if the detection values are abnormal, the determination component 71 outputs the different control signals to drive the warning component 73 to respectively send out the different warning signals. For example, if the determination component 71 determines that corresponding detection values obtained through detecting the battery 65 by the current feedback circuits are lower than a normal value, a voltage of the battery 65 is determined to be too low, then a control signal is sent out for warning that battery power is insufficient, and if the warning component 73 is the buzzer at this time, the warning component 73 sends out a sound warning signal with one long and two short sound; if the determination component 71 determines that the corresponding detection values obtained through detecting the battery 65 by the current feedback circuits are higher than the normal value, the actuator 61 is determined to be over-current, then a control signal is sent out for warning that the actuator 61 is over current, and if the warning component 73 is the buzzer at this time, the warning component 73 sends out a sound warning signal with one long and three short sound; if corresponding detection values obtained through detecting the battery 65 by the heat sensing members 721 are different from the normal value, a temperature of the battery 65 is determined to be abnormal, then a control signal is sent out for warning that the temperature of the battery 65 is abnormal, and if the warning component 73 is the buzzer at this time, the warning component 73 sends out a sound warning signal with one long and four short sound; if corresponding detection values obtained through detecting an interior of the controller 7 by the heat sensing members 721 are different from the normal value, a temperature of the determination component 71 is determined to be abnormal, then a control signal is sent out for warning that the temperature of the determination component 71 is abnormal, and if the warning component 73 is the buzzer at this time, the warning component 73 sends out a sound warning signal with one long and five short sound; if corresponding detection values obtained through detecting the actuator 61 by the timing members 722 are different from the normal value, a running time of the actuator 61 is determined to exceed a standard and be abnormal, then a control signal is sent out for warning that the running time of the actuator 61 exceeds the standard and is abnormal, and if the warning component 73 is the buzzer at this time, the warning component 73 sends out a sound warning signal with two long and five short sound. Certainly, the warning assembly 73 may also inform a current power outputting status of the actuator 61 controlled by the controller 7. Specifically, the actuator 61 is preset to have at least two different rotating speed statuses and further provides corresponding speed limitations on the electric balance bike under different power outputting statuses; for example, the actuator 61 has three rotating speed statuses, including a first rotating speed status, a second rotating speed status, and a third rotating speed status, and if the warning component 73 is the buzzer at this time, the warning component 73 may respectively sound three times corresponding to the first rotating speed status, the second rotating speed status, and the third rotating speed status sound. Moreover, the power-on speed regulation control member 66 and the power-off brake control member 67 may also transmit a signal source to the determination component 71 through the controller 7 to determine whether there is abnormality or not.

In one embodiment, the battery 65 is a rechargeable lithium battery for hand tools, and the actuator 61 may be a brushless motor or other actuators that provide rotating power, such as a brush motor. The rechargeable lithium battery used for hand tools in the embodiment is not only small in size and light in weight, but also only needs to be connected by slidable plugging, which increases the convenience of use, and is suitable for short-range/short-time riding by children; moreover, the actuating assembly 6 is detected by using the power abnormality response system 70 to determine whether the actuating assembly 6 normally runs or not, if the actuating assembly 6 abnormally runs, different warning signals are respectively sent out, and the users may know which member in the actuating assembly 6 is abnormal and the reason thereof according to different warning signals, so that the abnormality may be conveniently and automatically eliminated, and the riding safety is further improved. Furthermore, the reset button 661 of the power-on speed regulation control member 66 cooperates with the power-off brake control member 67 to turn on or off power supply and control the actuator 61 to be in different rotating speed to provide corresponding speed limitations on the electric balance bike, so as to control a running speed of the electric balance bike, the users can stably control the actuation of the actuator 61 through the power-on speed regulation control member 66 or the power-off brake control member 67, operation of which is convenient and corresponding structural design is greatly simplified.

Figure 6:
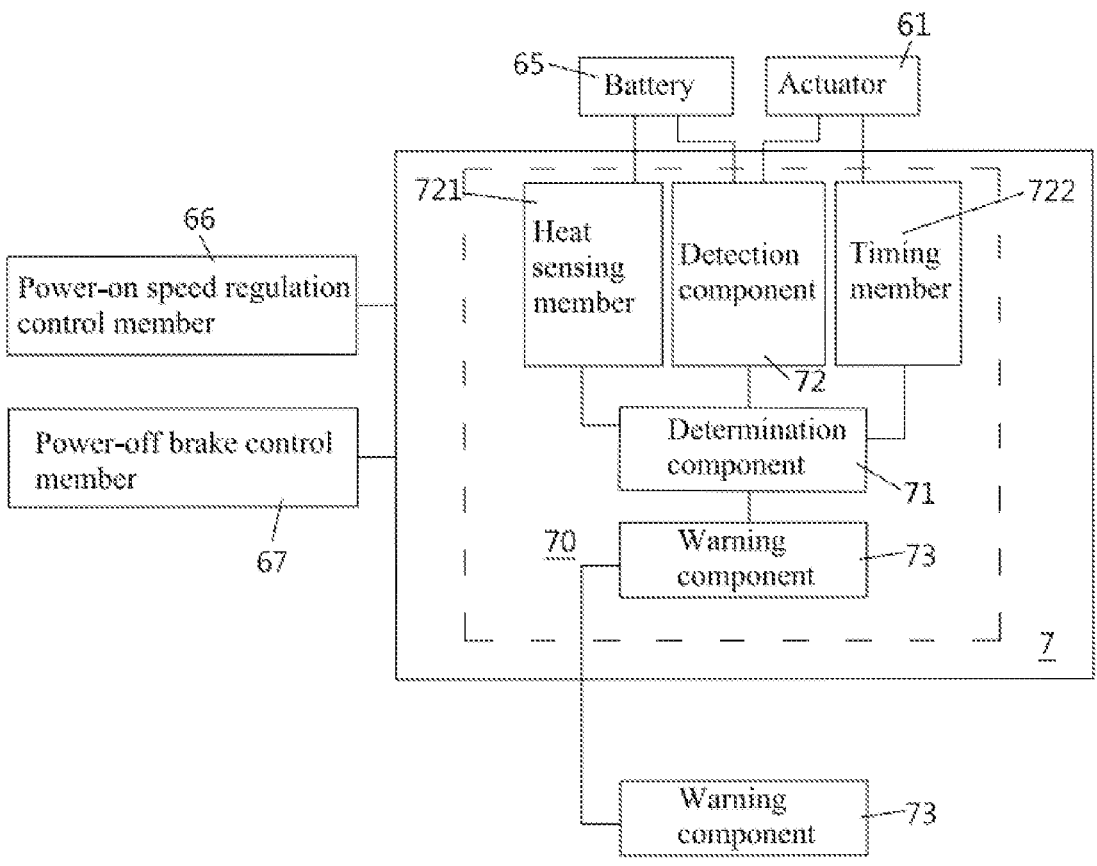
FIG. 6 is another structural schematic diagram of the power abnormality response system according to one embodiment of the present disclosure.

Furthermore, as shown in FIG. 6, an external warning component 73 may be connected, the external warning component 73 is connected to the determination component 71 to receive control signals output thereby to drive the warning component 73 to respectively send out at least one warning signal.

To sum up, the present disclosure provides embodiments of the electric balance bike, which submits as utility herewith; technical content and technical features of the present disclosure have been disclosed as above; however, those who skilled in the art may still make various alternatives and modifications without departing from spirits of the present disclosure based on the present disclosure. Therefore, protection scopes of the present disclosure should not be limited to those disclosed in the embodiments, but should include various substitutions and modifications without departing from the present disclosure, and are covered by the protection scopes of the present disclosure.

What is claimed is:

1. An electric balance bike comprising:
a bike frame comprising a seat at an intermediate position thereof, a head tube at a front end thereof, and a rear fork at a rear end thereof;
a front fork connected to a lower end of the head tube;
a handlebar connected to the head tube, the handlebar configured to control rotation of the front fork;
a front wheel connected to the front fork;
a rear wheel connected to the rear fork;
an actuating assembly arranged between the bike frame and the rear wheel, the actuating assembly comprising an actuator located below an intermediate section of the bike frame, a driving member located at an axle of the rear wheel, and a driving belt that is wrapped around the actuator and the driving member;
a battery detachably connected to the actuating assembly; and
a controller comprising, a power abnormality response system;
the power abnormality response system comprising a determination component, detection components, and a warning component, the determination component being respectively connected to the detection components and the warning component, the detection components respectively detecting running statuses of the actuator and the battery and outputting detection values, the determination component receiving the detection values and determining whether the detection values are abnormal or not to output different control signals to drive the warning component to respectively send out different warning signals; and wherein the detection components comprise voltage feedback circuits and current feedback circuits, the battery is connected to the voltage feedback circuits, so that a voltage of the battery is detected to confirm an electric quantity of the battery; and the actuator is connected to the current feedback circuits, so that a current of the actuator is detected; and wherein the warning component is a buzzer, and when the determination component determines that corresponding detection values obtained through detecting the battery by the current feedback circuits are lower than a normal value, a voltage of the battery is determined to be too low, so that a control signal is sent out for warning that battery power is insufficient, and the warning component sends out a sound warning signal with one long and two short sound; and wherein
when the determination component determines that the corresponding detection values obtained through detecting the battery by the current feedback circuits are different from the normal value, the actuator is determined to be over-current, so that a control signal is sent out for warning that the actuator is over current, and the warning component sends out a sound warning signal with one long and three short sound.

2. The electric balance bike of claim 1, wherein the actuating assembly further comprises a power-on speed regulation control member and a power-off brake control member, the power-on speed regulation control member and the power-off brake control member are located at the handlebar and are respectively connected to the controller to control the battery to supply power or not and set power outputting statuses of the actuator according to changes of an operation program of the controller, so that a highest running speed of the electric balance bike is controlled.

3. The electric balance bike of claim 2, wherein the power-on speed regulation control member and the power-off brake control member are respectively arranged at a left side and a right side of the handlebar, and the power-on speed regulation control member comprises a reset button and a speed regulator.

4. The electric balance bike of claim 2, wherein the detection components are connected to the power-on speed regulation control member and the power-off brake control member.

5. The electric balance bike of claim 2, wherein the detection components comprise heat sensing members, the heat sensing members are respectively connected to the battery, the actuator, the power-on speed regulation control member, and the power-off brake control member for detecting running temperatures.

6. The electric balance bike of claim 2, wherein the detection components comprise timing members, the timing members are connected to the actuator, the battery, the power-on speed regulation control member, and the power-off brake control member for detecting running times.

7. The electric balance bike of claim 1, wherein the warning component sends out the sound warning signal or an image warning signal.

8. The electric balance bike of claim 2, wherein the controller controls the power outputting statuses of the actuator, so that the actuator has at least two different rotating speed statuses.

9. The electric balance bike of claim 5, wherein when corresponding detection values obtained through detecting the battery by the heat sensing members are different from the normal value, a temperature of the battery is determined to be abnormal, so that a control signal is sent out for warning that the temperature of the battery is abnormal, and the warning component sends out a sound warning signal with one long and four short sound; and wherein when the determination component determines that corresponding detection values obtained through detecting an interior of the controller by the heat sensing members are different from the normal value, a temperature of the determination component is determined to be abnormal, so that a control signal is sent out for warning that the temperature of the determination component is abnormal, and the warning component sends out a sound warning signal with one long and five short sound.

10. The electric balance bike of claim 6, wherein when the determination component determines that corresponding detection values obtained through detecting the actuator by the timing members are different from the normal value, a running time of the actuator is determined exceed a standard and be abnormal, so that a control signal is sent out for warning that the running time of the actuator exceeds the standard and is abnormal, and the warning component sends out a sound warning signal with two long and five short sound.

\* \* \* \* \*